July 31, 1923.

C. E. BATHRICK 1,463,569

UNITARY TRANSMISSION AND PUMP FOR MOTOR DRIVEN FIRE ENGINES

Filed Dec. 3, 1919      2 Sheets-Sheet 1

Charles E. Bathrick
INVENTOR

By George J. Noch
ATTORNEY.

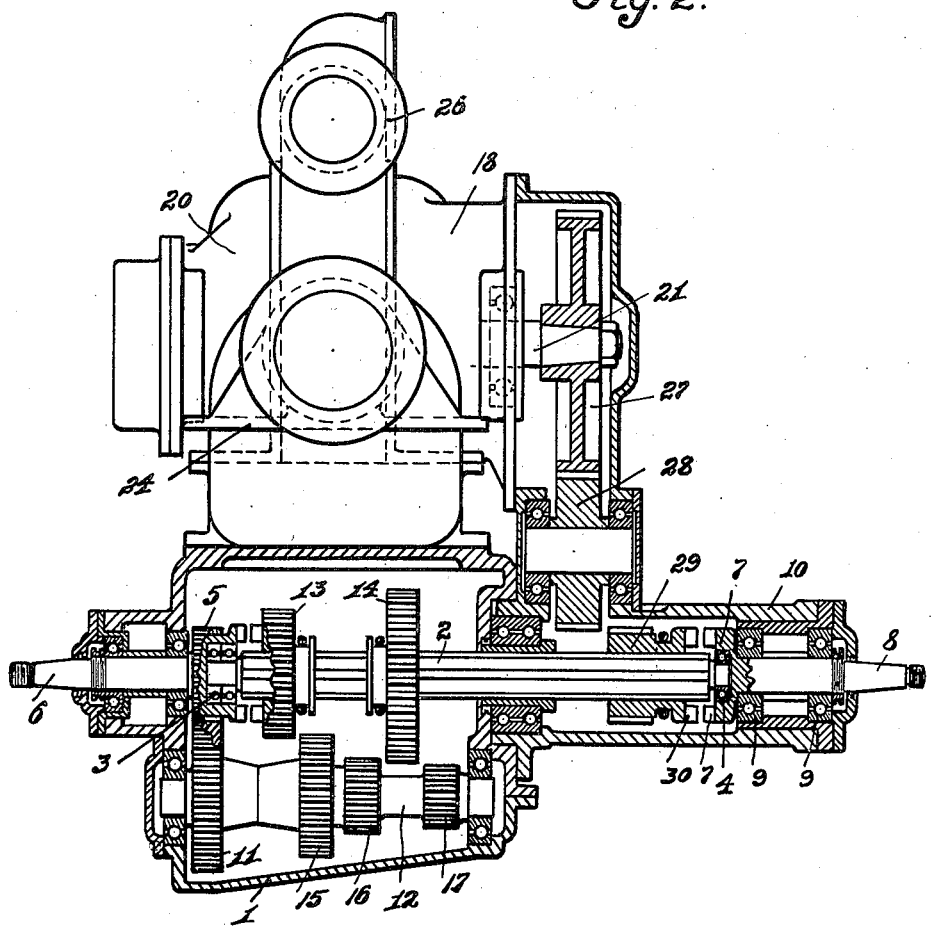

Patented July 31, 1923.

1,463,569

UNITED STATES PATENT OFFICE.

CHARLES E. BATHRICK, OF SOUTH BEND, INDIANA, ASSIGNOR TO SOUTH BEND MOTORS COMPANY, OF SOUTH BEND, INDIANA.

UNITARY TRANSMISSION AND PUMP FOR MOTOR-DRIVEN FIRE ENGINES.

Application filed December 3, 1919. Serial No. 342,233.

*To all whom it may concern:*

Be it known that I, CHARLES E. BATHRICK, a citizen of the United States, residing at South Bend, in the county of St. Joseph and State of Indiana, have invented certain new and useful Improvements in Unitary Transmissions and Pumps for Motor-Driven Fire Engines, of which the following is a specification.

The invention relates to rotary pumps for motor driven vehicles of the type used for fire engines and has for its object to provide a pump of this character, wherein the pump is located above the selective gear speed changing mechanism, commonly called the transmission of a motor driven vehicle, and so connected through gearing driven by said change speed mechanism so that the rotary pump may be driven at various speeds through the change speed mechanism.

A further object is to provide a rotary pump disposed above the transmission mechanism of a motor driven vehicle and at right angles to the drive shaft of said transmission mechanism, and to provide means whereby the gears forming the connection between the pump and the transmission may be thrown into gear with the transmission drive shaft and the variable speeds obtainable in the transmission imparted to the rotatable element of the pump. Also to provide means whereby the drive shaft leading to the differential of the vehicle will be disconnected from the drive shaft of the transmission when the gear driving means for the pump is thrown into operation.

A further object is to provide in combination with the transmission of a motor driven vehicle, a pump, which pump is located above the transmission in a casing secured to the upper side of the transmission casing. The transmission, its casing and the pump casing being supported by transversely disposed pipes which engage the side rails of the chassis and also form intakes for the pump.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2 is a sectional view taken on line 2—2 of Figure 1, showing the pump casing in elevation.

Figure 1:
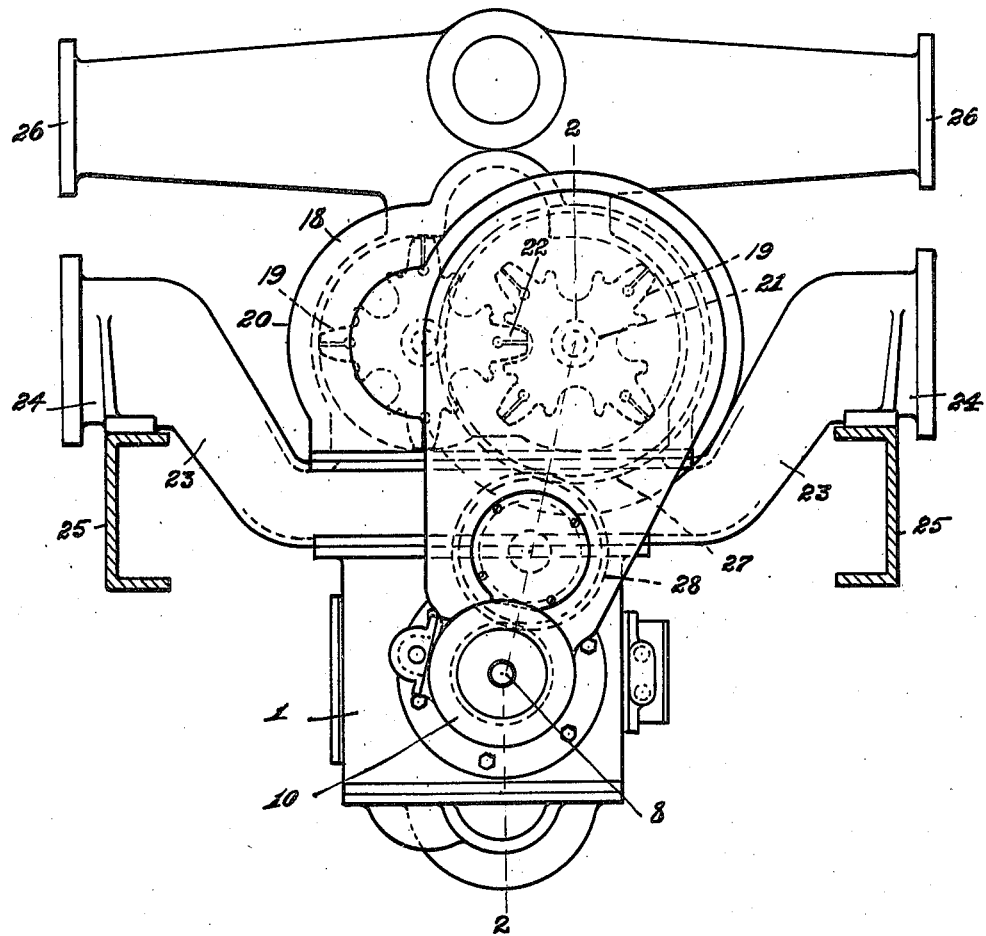
Figure 1 is a transverse sectional view through a motor vehicle chassis, showing the transmission and pump in rear elevation.

Referring to the drawings, the numeral 1 designates the transmission casing and 2 the main drive shaft thereof. The drive shaft 2 is rotatably mounted in bearings 3 and 4. The bearing 3 supports the drive shaft 2 within the gear 5 carried by the drive shaft 6 which is driven by the engine. Bearing 4 supports the rear end of the drive shaft 2 within a clutch member 7 of a stub shaft 8 which leads to the drive shaft which drives the differential of the vehicle, said stub shaft 8 being rotatably mounted in bearings 9 in the extension 10 of the casing 1. Constant gear 5 meshes with a constant gear 11 carried on a counter shaft 12, said constant gears, during the rotation of the drive shaft 6 rotating the counter shaft 12 at all times. However, various speeds are attained by shifting the gears 13 and 14 into mesh with gears 15, 16 and 17. When gears 13 and 15 are in mesh a high speed is attained and when gears 14 and 16 are thrown into mesh, a low gearing is attained. When it is desired to throw the mechanism into a different speed, gear 14 is thrown into mesh with gear 17. It is to be understood that the particular means for shifting the gears may be of any conventional form, also that any conventional form of transmission may be used.

Disposed on top of the transmission casing 1 and preferably at right angles thereto is a rotary pump 18, which pump comprises rotatable elements 19 of a conventional form, which elements are rotatably mounted within the casing 20. One of said pump elements is secured to a shaft 21 and is adapted to be rotated thereby. The other element, having its arms interengaging the arms of the first mentioned element as at 22, will be rotated by said rotatable element carried by the shaft 21. Extending outwardly from the sides of the pump 20 are intake pipes 23, which intake pipes extend upwardly and outwardly and terminate in horizontal portions 24 which rest upon the side rails 25 of the chassis and form supporting means for the pump and the transmission. The upper end of the pump casing 20 is provided with a multiple of discharge pipes 26, to which hose lines may be coupled as desired.

Pump shaft 21 has secured thereto a gear 27, which gear is adapted to be rotated through an idle gear 28 for rotating the pump elements. When it is desired to rotate the pump elements a slidable gear 29 which is slidably mounted on the drive shaft 2 is shifted into mesh with the idle gear 28. When the slidable gear 29 is shifted its clutch member 30 comes out of engagement with the clutch member 7 of the stub shaft 8, thereby preventing the further rotation of the stub shaft 8 and allowing the drive shaft 2, through the medium of the slidable gear 29 to impart revoluble movement to the idle gear 28. The idle gear 28 being in mesh with the gear 27 carried by the pump shaft 21 will cause said pump shaft and its revoluble element to rotate according to the speed of rotation of the drive shaft 2. The speed of rotation of the drive shaft 2 being capable of variation through the slidable gears 13 and 14, it will be seen that variable speeds of rotation may be imparted to the revoluble elements within the pump.

From the above it will be seen that all that will be necessary to do when it is desired to work the pump is for the slidable gear 29 to be shifted into engagement with the idle gear 28, which action will disconnect the drive shaft 2 of the transmission from the stub shaft 8 which drives the vehicle. Gear 29 being in mesh with the idle gear 28, the variable speeds imparted to the transmission drive shaft 2 by means of the gears within the transmission will be imparted to the revoluble elements 19 within the pump.

The invention having been set forth what is claimed as new and useful is:—

1. In a transmission and pump assembly supported by the side rails of the motor driven vehicle frame, the combination of a transmission casing longitudinally disposed and having a transmission therein, said transmission casing being disposed below the pump casing and rails of the frame and entirely supported by the rails of the frame, said pump casing having upwardly and outwardly extending transversely disposed intake pipes, said intake pipes being disposed on the side rails of the motor driven vehicle and entirely supporting the pump casing and the transmission casing.

2. In a transmission casing and pump casing assembly supported by the side rails of the frame of a motor driven vehicle, the combination of a transmission casing longitudinally disposed and located below the frame of the vehicle, transversely disposed intake pipes carried by the pump casing, said pump casing being disposed above the transmission casing and secured thereto, said intake pipes of the pump casing extending upwardly and outwardly and overlying the side rails of the vehicle frame and engaging the upper faces thereof and forming means for entirely supporting the transmission and pump casings.

3. In a transmission casing and pump casing assembly entirely supported by the side rails of the frame of a motor driven vehicle, the combination of a transmission casing longitudinally disposed and a pump casing having intake pipes transversely disposed, said transmission casing and pump casing being substantially underslung in relation to the frame and entirely supported by the engagement of the ends of the intake pipes of the pump with the upper faces of the side rails of the vehicle frame.

4. In a transmission casing and a pump casing assembly entirely supported by the side rails of the frame of a motor driven vehicle, said transmission and pump casings being disposed between the side rails and the transmission casing under-slung substantially below the side rails, of supporting means for entirely supporting said casings, said supporting means being formed by transversely disposed upwardly and outwardly extending intake pipes carried by the pump and secured to the upper sides of the side rails of the vehicle frame.

In testimony whereof I affix my signature.

CHARLES E. BATHRICK.